Oct. 26, 1937.  F. HOTCHNER  2,097,122
ANIMATED DISPLAY
Filed Dec. 21, 1936
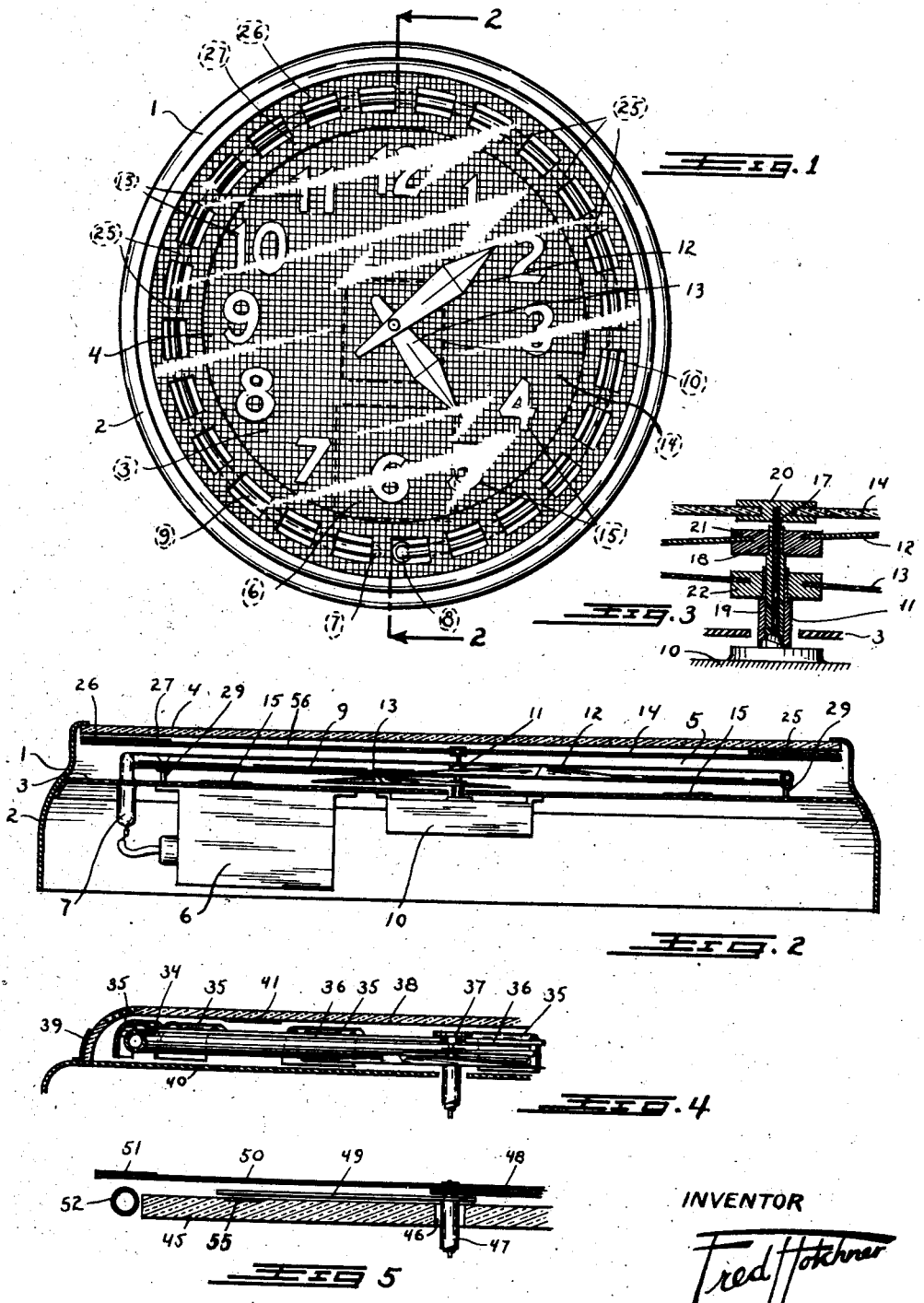
INVENTOR
Fred Hotchner Patented Oct. 26, 1937

2,097,122

UNITED STATES PATENT OFFICE 2,097,122

ANIMATED DISPLAY

Fred Hotchner, Los Angeles, Calif.

Application December 21, 1936, Serial No. 116,934

18 Claims. (Cl. 40—130)

This invention relates to an animated display and is directed to the production of a luminous display having a novel animated or traveling border effect in light produced without flashing or mechanically moving the light or lights involved.

In general it contemplates the use of a tubular light, such for instance, as a gaseous conduction lighting tube. Such tubes may be formed in any desired outline, and are most suitable for this work. However, other types of lights may be used if desired.

The invention is adapted to numerous uses as an advertisement. It may be used to produce the effect of motion along the course of a tube light either with or without additional display matter illuminated by the tube. I have chosen to illustrate the invention by one embodiment thereof in which a clock of conventional type is lighted by the tube which is caused to appear as though animated. It is to be understood that the invention is not limited to that embodiment, but may be variously modified and embodied within the purview of the claims.

It is an object of the invention to utilize a steadily burning light to produce the illusion of motion by mechanical means, making use of light, simple and reliable apparatus.

It is a further object of the invention to make use of the same light in a display to produce the illusion of motion along the course of the light and to illuminate additional display matter with a steady light.

It is a further object to reduce the relative contrast in the intensities of a tube light and additional display matter which is lighted by the same to reduce the glare of the tube and conserve energy. In this connection it is an additional object to make use of a good portion of the light of the tube which is obstructed to direct view to increase the light on such additional display matter.

In the particular embodiment of the invention illustrated in the drawing and in others which may be derived from it is a further object of the invention to provide a display having a border tube which is caused to appear as though moving by means of a light intercepting element which permits full view of the clock face proper or of similar display matter enclosed by the tube. It is also an object in this regards to provide an apparatus which may be used in connection with the standard types of three hand clock movements, either spring or electrical operated, the third or second hand, making one revolution per minute, being used to carry the interceptor. This interceptor when formed from a sheet of transparent material serves an additional object in helping to distribute the light from the tube over the display matter enclosed thereby.

By use of the principles of this invention it is possible to construct portable displays which may be handled in shipment, installation and service as readily and with as little trouble as the common electric clocks now widely used.

Further objects of the invention will become apparent from the drawing and the following specification.

The invention is illustrated in its preferred embodiment as an illuminated electric clock in the accompanying drawing in which three modifications thereof are shown. In the drawing, the same numeral appearing in more than one view indicates the same part in all instances.

The clock shown in Figure 1 is provided with a border tube which lights the hands and characters with a steady light and is made to appear as though turning by means of an interceptor disk which modifies light rays going forward from the tube to the observer.

Figure 2 is a sectional view of the same taken on the section line 2—2, of Figure 1 with the transformer, hands and clock works appearing in full view.

Figure 3 is an enlarged cross section of the shaft and bushing assembly for carrying the hands and interceptor disk.

Figure 4 is a sectional view, similar in its selection to that in Figure 2, of a modification of the device shown in the previous views. A little more than one-half the device is shown. The interceptor element in this instance consists of a series of opaque metal segments carried by a wire ring which is connected to the shaft by wire spokes.

Figure 5 is a similar section of a further modification in which a glass plate is used to form the clock proper with the tube positioned to send its rays directly through the glass to light the characters. This form of the invention is suitable for indoor installations.

In Figures 1 to 3, numeral 1 indicates a clock having a casing 2 which forms the body. In the casing are positioned the dial 3 and the cover glass 4, which together form a chamber 5 in which are the hands, the luminous tube and the interceptor disk. In the clocks of this general type, the cover glass aids in the distribution of light over the dial. When the dial itself has a surface which reflects light at a sharp angle, reflection back and forth between the cover glass and the dial may be used to carry light toward the center of clocks of surprisingly large diameter. Since the angles at which the rays hit the dial are very sharp, they will be largely reflected from a dial of any color or shade provided that the surface is finished glossy, as by enamel or varnish. Dials of dark background and white characters, commonly used for similar service, have been found entirely satisfactory. In the instant invention, when the interceptor disk is made of a transparent plate, it also serves this purpose. In fact, for indoor installations, the cover glass may be removed and the interceptor disk charged with the duty of spreading the light over the dial.

The tube 9, which is supported from the dial by the insulating posts 29, has two terminal electrodes 7 and 8 which extend through holes in the dial and are connected to the transformer 6 which is fastened to the rear of the dial. The clock works 10, also secured to the rear of the dial, have the shaft assembly 11 extending through a hole in the dial into the chamber 5. The assembly includes the shaft 17, and the bushings 18 and 19, all concentric with each other and geared in the usual manner of the three hand clock. They carry, respectively, the interceptor disk 14, and the minute and hour hands, 12 and 13. These are carried by the hubs 20, 21 and 22, respectively, by press fits on the shaft and bushings. If desired the shaft 17 may be geared to a higher speed than that of the usual second hand. I have found that satisfactory results are secured if this shaft makes from 5 to 10 revolutions per minute instead of the usual one revolution per minute rate of the typical clock movement.

The best results are secured by making the dial of a dark color and the characters and hands light to reflect the rays from the tube. The characters may be formed on the dial or on the cover glass. In this case they are formed on the dial and indicated by 15. So far as the purposes of this invention are concerned, the characters may be formed in any fashion or impressed on the surfaces by any method or of any material which will insure their becoming luminous to the observer when lighted by the tube. They may be located on either surface of the glass plate, or on the dial.

The interceptor disk may be formed of celluloid, glass or any suitable plastic or other transparent material. Around the edge of the disk and over the position of the tube are a number of light intercepting segments, 25, 25, etc. They may be painted on the disk, although other constructions are possible. Preferably an opaque ring is formed on each side of the tube to the view. These rings, 26 and 27, serve to more clearly cut the tube out to view and dispose of undesired reflections from the dial.

In Figure 1 the dial is indicated as being black by the cross shading. The segments 25, 25, etc., and the rings 26 and 27 on the interceptor disk are also indicated as being finished black. In order to distinguish the dial from the dark surfaces on the interceptor disk, the cross shading lines are offset on the dial from corresponding lines on the disk in both the vertical and the horizontal direction. There is no need of finishing the dial black behind the tube. On the other hand it is advantageous to finish the dial light or leave it in the light reflecting condition immediately behind the tube. Thus, in the drawing, by omitting the shading lines on the dial surface where it appears between the segments on the disk, I indicate that the surface at that region is not finished black. The center portion of the interceptor disk, indicated by numeral 56 is transparent and not specifically indicated in Figure 1. Surface reflections are indicated on the cover glass 8 crossing the details of the disk, dial, tube and hands.

While the segments are preferably opaque to the light rays, they may quite obviously modify the radiation in other ways. For instance, they may be spectral selective so as to filter the rays passing through them and produce a compound color effect to the eye. Thus with neon gas, the tube would appear orange red. By making the segments of filtering substance, the obstructed light may be made to appear as a deep blue, dark red, or pure yellow. Other modes of modifying the light through the segments are contemplated in this invention.

By treating the back of the segments and the rings to render them light reflective, a considerable portion of the light thus intercepted will be returned to the dial and help to light the hands and figures. The segments, caused to travel around the course of the tube, give the illusion to the observer of the tube itself actually turning. The hands are preferably made beveled in order to more effectively intercept the light rays coming at them from the side.

In the device shown in Figure 4 the interceptor is formed of a number of metal segments carried by a wire ring 34 which is mounted on wire spokes 36 carried by the hub 37. The segments, indicated by 35, 35, etc., are bent around the tube to more directly reflect light back to the clock face. The dial 40 itself, in this case, forms the body of the sign and the cover glass 38 is formed with a return rim which is held to the dial by the bezel ring 39. The characters 41 are formed on the inside surface of the cover glass, and are of light diffusive material such as white zinc paint. Reflection between the dial and the glass supplements the direct light of the tube intercepted by the characters and scattered to render them luminous to the eye. Otherwise the details of this clock are similar to those of the clock of the previous views.

In the device shown in Figure 5, the clock face is formed of a plate of glass with the tube around the edge in such position as to send a large portion of its rays directly through the glass. The plate, indicated by 45, has a hole in the center, indicated by 46, through which a shaft and bushing assembly 47, similar to those of the clocks described above extends. The hands 48 and 49, are flat in this case. The interceptor disk 50 is of the transparent plate type with the segments 51 painted on one surface. The disk serves by reflection to distribute light over the hands from the tube, indicated by 52. This device is suitable for indoor installations. Indicia are formed from a surface of the plate by etching or sand blasting as indicated by 55. The characters may also be formed by painting, printing or otherwise impressing on the surface with pigments or other light dispersing material. The remaining details are typical, and hence are not shown.

It will be understood that the specific forms of the invention disclosed are by way of illustration and the appended claims are not limited thereby except so far as stated in the claims. For the sake of brevity the following definitions will apply to terms found in the claims.

"Display pattern" shall include any design, characterization or symbol, or one or any number thereof. "Interceptor" shall include any part or structure used for the purpose defined. "Indicia" shall include any design, letter, symbol, figure, or similar characterization, or one or any number thereof. It shall include both objects in the form thereof and impressions indicative thereof. "Light intercepting" shall include any property which so modifies light rays that the portion or portions of the source from which such rays emanate will be visibly different in appearance from other portions of the source the rays from which reach the eye unaltered at the same instant of view. Thus the term includes spectral selection, diffraction, dispersion, reduction, or total obstruction. The term "transparent" shall apply as descriptive of objects of transparent material and objects having open spaces through which the indicia may be viewed. "Clock" shall include any instrumentality indicative of progressive change. "Around the dial" and similar expressions shall include the positioning of the tube in any wise in the vicinity of the outer portion of the dial to effect the results defined. "Light source" is to include any type of light in the general form described. The expressions "in front of" and "sideways" have reference to the ordinary positions of observers.

This application is related to my copending application, Serial No. 117,169, filed December 22, 1936, in which the principles herein disclosed are applied in the production of novel animated effects.

Having thus described my invention, what I claim is:

1. In a luminous display, an elongated light source having a continuous luminous column in the form of a display pattern and exposed to view by direct radiation therefrom, a light interceptor having a plurality of light intercepting segments spaced along the course of said source and in front of the same with respect to the observer and means to move the same whereby each of said segments progressively intercepts the light from successive portions of said source to produce the effect of motion therealong, and additional display matter in the vicinity of said source disposed to be illuminated by rays therefrom other than the rays passing through said interceptor and to be visible from the front of said display.

2. In a luminous display, an elongated light source, indicia disposed in the vicinity thereof to be lighted thereby and viewed from the front of said display, a light interceptor having light intercepting segments spaced along the course of said source and in front of the same with respect to the observer to intercept rays from said source other than those rays furnishing the major illumination of said indicia and means to move said interceptor whereby to produce the effect of motion through the course of said source.

3. In a luminous display, a tubular light exposed direct to view as part of the display matter, indicia in the vicinity thereof so disposed as to be lighted directly thereby, a light interceptor having a plurality of light intercepting segments spaced along said light and in front thereof with respect to the observer and means to move the same to produce the effect of motion along said light.

4. In a luminous display, an elongated tubular light forming at least in part a circuitous pattern, indicia in the vicinity thereof so positioned as to be lighted thereby, a light interceptor disposed to turn around an axis within said pattern and having light intercepting segments spaced along the course of said light and in front thereof with respect to the observer and means to turn said interceptor.

5. In a luminous display, an elongated tubular light forming at least in part a circuitous pattern, indicia in the area enclosed by said pattern so positioned as to be illuminated by said light, a light interceptor disposed to turn around an axis within said pattern and having light intercepting segments spaced along the course of said light and in front thereof with respect to the observer and means to turn said interceptor.

6. In a luminous display, an elongated tubular light forming at least in part a circuitous pattern, indicia in the area enclosed by said pattern so positioned as to be illuminated by said light and viewed from the front of said display, a light interceptor positioned in front of said indicia and said light, said interceptor being transparent over the region occupied by said indicia and having light intercepting segments spaced along the course of said light and means to turn said interceptor around an axis enclosed by said pattern whereby to produce the effect of motion along said light.

7. In an illuminated clock, a dial, indicia on said dial, hands in front of said dial, a luminous tube forming a border for said dial and disposed to light said hands and indicia, a light interceptor in front of said indicia, hands and tube, said interceptor being transparent over the region occupied by said hands and indicia and having a plurality of light intercepting segments spaced along the course of said tube and means to turn said interceptor around an axis within said border whereby to produce the effect of motion along said tube.

8. In an illuminated clock, a dial, a luminous tube disposed so as to illuminate said dial and send light rays other than those illuminating said dial forward to the observer, a clock works mechanism behind said dial and having three concentric driving elements extending through said dial, a pair of hands in front of said dial carried by two of said driving elements, and a light interceptor carried by the third of said driving elements and having a plurality of light intercepting segments spaced along the course of said tube.

9. In an illuminated clock, a dial, a luminous tube disposed so as to form a border for said dial, a clock works mechanism behind said dial and having three concentric driving elements extending through said dial, a pair of hands in front of said dial carried by two of said driving elements, and a light interceptor consisting of a plate of transparent material carried by the third of said driving elements and in front of said hands, said interceptor having a plurality of light intercepting segments spaced along the course of said tube and in front thereof and aiding by reflection to distribute the light from said tube over said hands.

10. In an illuminated clock, a dial, indicia on said dial, hands in front of said dial, a transparent interceptor mounted to turn in front of said hands and indicia, a luminous tube around said dial disposed to send light rays between said dial and said interceptor, said interceptor aiding by reflection in distributing the light over said hands and said indicia, light intercepting segments carried by said interceptor spaced along and in front of said tube, and means to turn said interceptor whereby to produce the effect of motion along said tube.

11. In an illuminated display, a plate of transparent material having indicia formed at a surface thereof and characterized by the property of becoming apparently luminous through the incidence of light rays thereon from within, a luminous tube positioned around the edge of said plate, additional display matter positioned in front of said plate, a transparent interceptor positioned in front of all of said elements and having light intercepting segments spaced along and in front of said tube, said interceptor aiding by reflection to distribute light over said additional display matter and means to turn said interceptor.

12. In an illuminated clock, a plate of transparent material in the form of a dial, indicia formed at a surface of said dial and characterized by the property of becoming apparently luminous through the incidence of light rays thereon from within said plate, a luminous tube positioned around the edge of said dial so as to radiate light therethrough, hands in front of said dial and clockworks behind said dial driving said hands, a transparent interceptor in front of said hands and having light intercepting segments spaced along and in front of said tube, the positioning of said dial, interceptor and tube being such that said interceptor aids by reflection in distributing light over said hands, and means to turn said interceptor whereby to represent motion along said tube.

13. In an illuminated clock, a dial, hands in front of said dial, clock works mechanism behind said dial and having means extending through said dial to carry said hands, a luminous tube in the form of a border for said dial and disposed to radiate light on said dial and said hands, a light interceptor in front of said dial and said hands and constructed to permit clear view of said dial and said hands, said interceptor having a plurality of light intercepting segments spaced along the course of said tube, and means to turn said interceptor around an axis within said border whereby to produce the effect of motion along said tube.

14. In an illuminated display, a plate of light transmitting material having indicia formed at a surface thereof, said indicia being characterized by the property of becoming apparently luminous upon the incidence of light rays thereon from within said plate, a luminous tube positioned around the edge of said plate so as to radiate light rays therein in such manner as to illuminate said indicia, there being an opening through said plate and a driving mechanism behind the same, said mechanism having shaft means extending through said opening to the front of said plate, and a light interceptor carried by said shaft means in front of said plate and having light intercepting segments spaced along the course of said tube and in front thereof and so constructed as to expose said indicia to view therethrough.

15. In an illuminated display, a plate of light transmitting material having indicia formed at a surface thereof, said indicia being characterized by the property of becoming apparently luminous upon the incidence of light rays thereon from within said plate, a luminous tube positioned around the edge of said plate so as to be visible from the front of said display and to radiate light rays into said plate to illuminate said indicia, there being an opening through said plate and a driving mechanism behind the same having a shaft means including a plurality of concentric driving elements extending through said opening to the front of said plate, one of said driving elements carrying an interceptor having a plurality of light intercepting segments spaced along the course of said tube and in front thereof and so constructed as to expose said indicia to view, and an additional display element carried by another of said driving elements in front of said plate.

16. A luminous display including a background member having indicia thereon, an elongated luminous tube in the form of a display pattern positioned forward of said background and directly lighting said indicia, a mechanical interceptor having light intercepting segments spaced along the course of said tube and disposed to move in front of the same to produce an attraction effect by the interception of rays passing generally forward from said tube, and means to move said interceptor, said tube and said interceptor being positioned to operate in such close relation to each other that the effect thus produced is observable from the majority of all normal positions of observation.

17. A luminous display including an elongated luminous tube in the form of a display pattern positioned to be observed by its own light, a mechanical interceptor having light intercepting segments spaced along the course of said tube and disposed to move in front of the same to produce an attraction effect by the interception of rays passing generally forward from said tube, means to move said interceptor, and additional display matter positioned to be lighted by rays other than the rays passing through said interceptor and to be observed from the front of said display, said tube and said interceptor being positioned to operate in such close relation to each other that the effect thus produced is observable from the majority of all normal positions of observation.

18. A luminous display including a luminous tube in the form of a display pattern positioned to be observed by its own light, a mechanical interceptor having light intercepting segments spaced along the course of said tube and disposed to move in front of the same to produce an attraction effect by the interception of light rays passing generally forward from said tube, the rear surfaces of said segments being light reflecting, and additional display matter positioned to be lighted by direct rays from said tube and reflected rays from said segments and to be observed from the front of said display.

FRED HOTCHNER.